(12) United States Patent
Schoonebeek et al.

(10) Patent No.: US 10,125,018 B2
(45) Date of Patent: Nov. 13, 2018

(54) METHOD FOR PRODUCING A SYNGAS STREAM

(71) Applicant: SHELL OIL COMPANY, Houston, TX (US)

(72) Inventors: Ronald Jan Schoonebeek, Amsterdam (NL); Alouisius Nicolaas Renée Bos, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 12 days.

(21) Appl. No.: 15/324,123

(22) PCT Filed: Jul. 6, 2015

(86) PCT No.: PCT/EP2015/065332
§ 371 (c)(1),
(2) Date: Jan. 5, 2017

(87) PCT Pub. No.: WO2016/005317
PCT Pub. Date: Jan. 14, 2016

(65) Prior Publication Data
US 2017/0166444 A1    Jun. 15, 2017

(30) Foreign Application Priority Data
Jul. 8, 2014 (EP) ..................... 14176091

(51) Int. Cl.
*C01B 3/24* (2006.01)
*C01B 3/06* (2006.01)

(52) U.S. Cl.
CPC ............. *C01B 3/24* (2013.01); *C01B 3/06* (2013.01); *C01B 2203/0272* (2013.01); *C01B 2203/1235* (2013.01); *Y02P 20/142* (2015.11)

(58) Field of Classification Search
CPC ..... C01B 2203/0272; C01B 3/24; C01B 3/06; C01B 2203/1235; Y02P 20/142
See application file for complete search history.

(56) References Cited

U.S. PATENT DOCUMENTS

| | | | |
|---|---|---|---|
| 3,864,460 A * | 2/1975 | Connell ................ | B01D 53/52 423/228 |
| 2002/0100216 A1* | 8/2002 | Colombani ............. | B01J 8/062 48/197 R |
| 2004/0118047 A1 | 6/2004 | Choudhary et al. | |
| 2005/0003247 A1 | 1/2005 | Pham | |

FOREIGN PATENT DOCUMENTS

| | | | | |
|---|---|---|---|---|
| EP | 0219163 | 4/1987 | | |
| EP | 1227062 | 7/2002 | | |
| GB | 365912 | 1/1932 | | |
| GB | 365912 A * | 1/1932 | ............ | C10B 57/18 |
| GB | 2265382 | 9/1993 | | |

OTHER PUBLICATIONS

International Search Report for PCT/EP2015/065332 dated Oct. 14, 2015; 4 pages.
Research Disclosure, Hampshire, GB, No. 327, Jul. 1, 1991 (Jul. 1, 1991), p. 563, XP000258792, ISSN: 0374-4353 * the whole document.

* cited by examiner

*Primary Examiner* — Amber R Orlando
*Assistant Examiner* — Syed T Iqbal

(57) ABSTRACT

The present invention provides a method for producing a syngas stream, the method at least comprising the steps of: (a) providing a hydrocarbon-containing stream; (b) providing a reactor containing a heated mass of solids at a temperature of at least 1000° C.; (c) cracking the hydrocarbon-containing stream provided in step (a) in the reactor containing the heated mass of solids provided in step (b), thereby at least obtaining C and $H_2$; (d) removing an $H_2$-containing stream from the reactor; (e) converting the C obtained in step (c) in the reactor at an $H_2O/CO_2$ vol. % feed ratio of greater than zero, thereby obtaining a $CO/H_2$-containing stream; (f) removing the $CO/H_2$-containing stream from the reactor; (g) combining the $H_2$-containing stream removed in step (d) with the $CO/H_2$-containing stream removed in step (f) thereby obtaining a syngas stream.

9 Claims, No Drawings

METHOD FOR PRODUCING A SYNGAS STREAM

PRIORITY CLAIM

The present application is the National Stage (§ 371) of International Application No. PCT/EP2015/065332, filed Jul. 6, 2015, which claims priority from European Patent Application No. 14176091.8, filed Jul. 8, 2014 incorporated herein by reference.

The present invention relates to a method for producing a syngas stream, in particular a non-catalytic method. Various methods for producing a syngas stream are known in the art.

An example of a non-catalytic method for producing syngas is disclosed in GB 2 265 382.

A problem of the method as disclosed in GB 2 265 382 is that the ratio of the $H_2$ and CO in the produced syngas is fixed (3:1; i.e. a $H_2$/CO vol. % ratio of 3.0). This fixed $H_2$/CO vol. % ratio is not always suited for subsequent processing, such as for Fischer-Tropsch reactions.

GB 365 912 (published in January 1932) relates to the manufacture of combustible gas rich in hydrogen by the pyrogenous decomposition of hydrocarbons by passing hydrocarbons through an ignited bed of solid fuel such as coal. The natural gas as used in the example which is passed through the fuel bed contains 17.6% $C_2H_6$, 75.0% $CH_4$, 0.4% $CO_2$, 0.2% $O_2$ and 6.8% $N_2$, but no mercaptans. Furthermore, the bed of solid fuel is ignited to provide the heat for the pyrogenous decomposition of the hydrocarbons. That implies the fuel bed is consumed and need to be replaced when it can no longer provide the necessary heat for the decomposition of hydrocarbons.

EP 0 219 163 A2 (published in April 1987) relates to a process for producing a hydrogen-containing gas which comprises the following steps:

(i) cracking hydrocarbonaceous material substantially in the absence of steam into carbon and hydrogen-containing gas by contacting said material with a heated mass of non-fluidized solids and allowing carbon to deposit on the solids; and (ii) steam gasification of carbon formed in step (i). EP 0 219 163 suggests to subject natural gas to a treatment to remove sulphur and/or inorganic substances before using it as a feed for the process. No specific mention of mercaptans is made in EP 0 219 163. Furthermore, there is no mention of any carbon dioxide being used in the steam gasification step to convert carbon formed into carbon monoxide.

It is an object of the present invention to overcome or minimize the problem of a fixed ratio of $H_2$ and CO in the produced syngas to have more options for further processing, e.g. in Fischer-Tropsch reactions. More generally, it is an object of the present invention to provide an alternative method for producing a syngas stream, in particular a non-catalytic method, which method allows to obtain a flexible $H_2$/CO vol. % ratio of the produced syngas.

It is another object of the present invention to provide an alternative method for producing a syngas stream, in particular a non-catalytic method, which uses a bed of solid materials which can be used for longer periods of time without being consumed.

It is a further object of the present invention to provide a method which allows to process a hydrocarbon-containing stream that contains mercaptans, without the need for amine treating or other separation to remove mercaptans before converting the hydrocarbon-containing stream into syngas.

One or more of the above or other objects can be achieved by providing a method for producing a syngas stream, the method at least comprising the steps of:
(a) providing a hydrocarbon-containing stream;
(b) providing a reactor containing a heated mass of solids at a temperature of at least 1000° C.;
(c) cracking the hydrocarbon-containing stream provided in step (a) in the reactor containing the heated mass of solids provided in step (b), thereby at least obtaining C and $H_2$;
(d) removing an $H_2$-containing stream from the reactor;
(e) converting the C obtained in step (c) in the reactor at an $H_2O/CO_2$ vol. % feed ratio of greater than zero, thereby obtaining a CO/$H_2$-containing stream;
(f) removing the CO/$H_2$-containing stream from the reactor;
(g) combining the $H_2$-containing stream removed in step (d) with the CO/$H_2$-containing stream removed in step (f) thereby obtaining a syngas stream.

It has surprisingly been found that the method according to the present invention allows to produce a syngas stream with a flexible $H_2$/CO vol. % ratio in a surprisingly simple manner. An important advantage of the present invention is that $CO_2$ can be used to produce the CO; usually it is very difficult to 'reform' $CO_2$ with e.g. $CH_4$ into CO/$H_2$ in view of carbon formation on (cracking) catalysts. A further advantage according to the present invention is that no catalysts need to be used for cracking. As a consequence, the method according to the present invention can also be used for hydrocarbon-containing streams containing $H_2S$ and mercaptan compounds (which typically need to be removed in case of catalytic methods for producing syngas to prevent poisoning of the catalyst). Further, the hydrocarbon-containing stream to be used in the present invention is not critical with respect to amounts of olefins and the like; the hydrocarbon-containing stream may contain higher amounts thereof which would otherwise result in poisoning of the catalysts. Also, no expensive amine treating units or the like are needed to treat the stream provided in step (a) to remove any mercaptans before cracking in step (c).

A further advantage according to the present invention is that there is no need for an ASU (Air Separation Unit) as no high purity $O_2$ is required; this makes the method suitable for applying in small-scale operations.

In step (a), a hydrocarbon-containing stream is provided. This hydrocarbon-containing stream is not limited in any way and may be natural gas, associated gas, crude oil and the like. Typically the hydrocarbon-containing stream is a hydrocarbon-containing gas stream, preferably containing at least 30 vol. % methane.

As mentioned above, the method according to the present invention is suited for hydrocarbon-containing streams that contain some contaminants that are not desired in case of catalytic methods for producing syngas. Hence, in a preferred embodiment of the present invention, the hydrocarbon-containing stream provided in step (a) comprises at least 10 ppm mercaptans (such as—but not limited to—methanethiol ($CH_3SH$), ethylmercaptan ($C_2H_5SH$) and propylmercaptan ($C_3H_7SH$)), preferably at least 50 ppm, more preferably at least 80 ppm. Furthermore, in another embodiment according to the present invention, the hydrocarbon-containing stream provided in step (a) comprises at least 1.0 vol. %, at least 2.0 vol. %, at least 3.0 vol. % or even at least 5.0 vol. % olefins.

In step (b), a reactor is provided that contains a heated mass of solids at a temperature of at least 1000° C. The person skilled in the art will readily understand that the heated mass of solids may be varied broadly. As an example, the heated mass of solids may be in the form of fixed beds containing heat-resistant solid material in any desired shape and size, such as a fixed brick matrix or a packed bed of particulate solids. Various solid materials may be used in the method according to the present invention; suitable solid materials comprise inert ceramic materials, refractory oxides (e.g. aluminium oxide, yttrium oxide, zirconium oxide), silicium carbide, carbonaceous materials, metal alloys and metal compounds, etc. The increased temperature of the heated mass of solids may be obtained in various ways.

In step (c), the hydrocarbon-containing stream provided in step (a) is cracked in the reactor containing the heated mass of solids provided in step (b), thereby at least obtaining C (carbon) and $H_2$ (hydrogen). Typically, the C obtained in step (c) is deposited on the heated mass of solids in the reactor.

Preferably, the reactor containing the heated mass of solids is in step (c) at a temperature of at least 1100° C., preferably at least 1200° C., more preferably at least 1350° C. and at most 1500° C., preferably at most 1400° C. Typically, the cracking in step (c) is performed at a pressure in the range from 0.5 to 50 bara, preferably from 5 to 20 bara. As the person skilled in the art is familiar with (non-catalytic) cracking, this is not further discussed here in detail.

In step (d), an $H_2$-containing stream is removed from the reactor. Preferably, the $H_2$-containing stream removed from the reactor in step (d) comprises at least 1 ppm $H_2S$, preferably at least 2 ppm, which is at least partially removed before combining in step (g) thereby obtaining an $H_2S$-depleted $H_2$-containing stream. Preferably, the $H_2S$-depleted $H_2$-containing stream contains less than 0.1 ppm $H_2S$. As the person skilled in the art is familiar with the removal of $H_2S$ from a stream (e.g. using molsieves, amines, etc.), this is not further discussed here in detail.

Further, it is preferred that a part of the $H_2$-containing stream removed from the reactor in step (d) is used to heat the reactor, such as by combustion thereof. It goes without saying that part(s) of the $H_2$-containing stream removed from the reactor in step (d) may also be used for other uses such as hydrotreating, hydrocracking, etc.

In step (e), the C obtained in step (c) is converted in the reactor at an $H_2O/CO_2$ (water/carbon dioxide) vol. % feed ratio of greater than zero, thereby obtaining a $CO/H_2$-containing stream. The person skilled in the art will understand that the $CO/H_2$-containing stream as obtained in step (e) is a syngas stream; however, in order not to confuse the syngas stream as obtained in step (e) with the ($H_2$-enriched) syngas stream as obtained in step (g), the syngas stream as obtained in step (e) will be called "the $CO/H_2$-containing stream" herein. As the person skilled in the art is familiar with the kind of conversion as occurring in step (e), this is not further discussed here in detail. Typically, a $CO_2$-containing stream and/or steam is (are) fed to the reactor for obtaining the desired $H_2O/CO_2$ vol. % ratio in step (e); in the latter case the $H_2O/CO_2$ vol. % ratio is also the $H_2O/CO_2$ vol. % feed ratio. In an especially preferred embodiment the $CO_2$-containing stream is recycled from elsewhere in the process line-up or is obtained as an exhaust stream from a nearby process line-up; this advantageously results in a lowering of overall $CO_2$ footprint. Alternatively or additionally, the hydrocarbon-containing stream provided in step (a) contains $CO_2$.

Preferably, the reactor containing the heated mass of solids is in step (e) at a temperature of at least 1000° C., preferably at least 1100° C., more preferably at least 1200° C. and at most 1500° C., preferably at most 1400° C. Further, the conversion in step (e) is performed at a pressure in the range from 0.5 to 50 bara, preferably from 5 to 20 bara.

Further its is preferred that in step (e) the C obtained in step (c) is converted in the reactor at an $H_2O/CO_2$ vol. % feed ratio of at least 0.0001, preferably at least 0.001, more preferably at least 0.5, even more preferably at least 0.9, yet even more preferably at least 1.2 and at most 1000, preferably at most 100, more preferably at most 10, even more preferably at most 3.0, yet even more preferably at most 2.5 and most preferably at most 2.2. Preferably, in step (e) the C obtained in step (c) is contacted with steam.

In step (f), the $CO/H_2$-containing stream is removed from the reactor.

In step (g), the $H_2$-containing stream removed in step (d) is combined with the $CO/H_2$-containing stream removed in step (f) thereby obtaining a syngas stream. Typically, the syngas stream obtained in step (g) has a $H_2/CO$ vol. % ratio of between 0.5 and 5.0, usually above 0.9 and below 3.5. Preferably, the syngas stream obtained in step (g) has a $H_2/CO$ vol. % ratio of at least 1.0 and below 3.1, preferably at least 1.6, more preferably at least 1.75 and preferably at most 2.2, more preferably at most 2.05.

Hereinafter the invention will be further illustrated by the following non-limiting example.

EXAMPLES

In these calculated Examples (using HSC chemistry software, available from Outokumpu Research OY, Pori, Finland), a natural gas feed stream is used containing methane, nitrogen, 0.01 vol. % (i.e. 100 ppm) methanethiol ($CH_3SH$; a mercaptan that is typically present in natural gas) and 0.01 vol. % (i.e. 100 ppm) ethylmercaptan ($C_2H_5SH$).

The above natural gas feed stream is cracked in a reactor containing a heated mass of solids at an elevated temperature thereby obtaining C (deposited on the heated mass of solids) and $H_2$. The $H_2$-containing stream is removed from the reactor and subjected to amine treating to remove the $H_2S$ (formed in the reactor by conversion of the $CH_3SH$ and $C_2H_5SH$ into $H_2S$, $H_2$ and C).

The composition of the above natural gas feed stream and the removed $H_2$-containing stream as well as the cracking conditions are given for Examples 1-8 in Table 1 below.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Composition of natural gas feed stream | | | | | | | | |
| $CH_4$ [vol. %] | 99.87 | 99.87 | 99.87 | 99.87 | 94.87 | 94.87 | 94.87 | 94.87 |
| $N_2$ [vol. %] | 0.1 | 0.1 | 0.1 | 0.1 | 0.1 | 0.1 | 0.1 | 0.1 |
| $H_2S$ [vol. %] | 0.01 | 0.01 | 0.01 | 0.01 | 0.01 | 0.01 | 0.01 | 0.01 |
| $CH_3SH$ [vol. %] | 0.01 | 0.01 | 0.01 | 0.01 | 0.01 | 0.01 | 0.01 | 0.01 |
| $C_2H_5SH$ [vol. %] | 0.01 | 0.01 | 0.01 | 0.01 | 0.01 | 0.01 | 0.01 | 0.01 |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $C_2H_4$ [vol. %] | — | — | — | — | 5 | 5 | 5 | 5 |
| Cracking properties | | | | | | | | |
| Pressure [bara] | 10 | 10 | 1 | 1 | 10 | 10 | 1 | 1 |
| Temperature [° C.] | 1300 | 1200 | 1300 | 1200 | 1300 | 1200 | 1300 | 1200 |
| Composition of $H_2$-containing stream | | | | | | | | |
| $CH_4$ [vol. %] | 1.83 | 2.83 | 0.2 | 0.3 | 1.83 | 2.83 | 0.2 | 0.3 |
| $N_2$ [vol. %] | 0.05 | 0.05 | 0.05 | 0.05 | 0.05 | 0.05 | 0.05 | 0.05 |
| $H_2S$ [vol. %] | 0.015 | 0.015 | 0.015 | 0.015 | 0.015 | 0.015 | 0.015 | 0.015 |
| $CH_3SH$ [vol. %] | — | — | — | — | — | — | — | — |
| $C_2H_5SH$ [vol. %] | — | — | — | — | — | — | — | — |
| $C_2H_4$ [vol. %] | — | — | — | — | — | — | — | — |
| $H_2$ [vol. %] | balance | balance | balance | balance | balance | balance | balance | balance |

The C obtained (as deposited on the heated mass of solids) is converted in the reactor at a specific $H_2O/CO_2$ vol. % ratio (tuned by the injection of $CO_2$ and $H_2O$) thereby obtaining a $CO/H_2$-containing stream, which is subsequently removed from the reactor. The $CO/H_2$-containing stream is subsequently combined with a $H_2$-containing stream (cf. Table 1) thereby obtaining a syngas stream. In these calculated Examples, such $H_2$-containing stream was assumed to contain about 99 vol. % $H_2$. The $H_2/CO$ vol. ratio of the syngas stream has been given in Table 2.

Table 2 below lists some Examples (Examples 9-20) with different conversion conditions and/or $H_2O/CO_2$ vol. % feed ratios for the stream fed to (by $H_2O$ en $CO_2$ injection) and to be converted in the reactor.

The person skilled in the art will readily understand that many modifications may be made without departing from the scope of the invention.

TABLE 2

|  | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|
| Composition of stream to be converted in reactor | | | | | | | | | | | | |
| $CO_2$ [vol. %] | 99.80 | 99.80 | 99.80 | 99.80 | 49.95 | 49.95 | 49.95 | 49.95 | 0.10 | 0.10 | 0.10 | 0.10 |
| $H_2O$ [vol. %] | 0.10 | 0.10 | 0.10 | 0.10 | 49.95 | 49.95 | 49.95 | 49.95 | 99.80 | 99.80 | 99.80 | 99.80 |
| $N_2$ [vol. %] | 0.1 | 0.1 | 0.1 | 0.1 | 0.1 | 0.1 | 0.1 | 0.1 | 0.1 | 0.1 | 0.1 | 0.1 |
| $H_2$ [vol. %] | — | — | — | — | — | — | — | — | — | — | — | — |
| $H_2O/CO_2$ feed ratio | 0.001 | 0.001 | 0.001 | 0.001 | 1 | 1 | 1 | 1 | 998 | 998 | 998 | 998 |
| Conversion conditions | | | | | | | | | | | | |
| Pressure [bara] | 10 | 10 | 1 | 1 | 10 | 10 | 1 | 1 | 10 | 10 | 1 | 1 |
| Temp. [° C.] | 1200 | 1090 | 1200 | 1090 | 1200 | 1090 | 1200 | 1090 | 1200 | 1090 | 1200 | 1090 |
| Composition of CO/H2-containing stream | | | | | | | | | | | | |
| CO [vol. %] | 99.1 | 97.6 | 99.7 | 99.7 | 74.45 | 73.35 | 74.83 | 74.78 | 49.7 | 49.2 | 49.85 | 49.81 |
| $H_2O$ [vol. %] | — | — | — | — | 0.4 | 0.9 | 0.1 | 0.1 | 0.6 | 1.2 | 0.16 | 0.19 |
| $N_2$ [vol. %] | 0.05 | 0.05 | 0.05 | 0.05 | 0.05 | 0.05 | 0.05 | 0.05 | 0.05 | 0.05 | 0.05 | 0.05 |
| $H_2$ [vol. %] | 0.05 | 0.05 | 0.05 | 0.05 | 24.5 | 24.1 | 24.9 | 24.9 | 48.8 | 47.7 | 49.86 | 49.77 |
| $CO_2$ [vol. %] | 0.8 | 2.3 | 0.2 | 0.2 | 0.4 | 1.3 | 0.11 | 0.14 | 0.24 | 0.6 | 0.06 | 0.09 |
| $CH_4$ [vol. %] | — | — | — | — | 0.20 | 0.30 | 0.01 | 0.03 | 0.61 | 1.25 | 0.02 | 0.09 |
| $H_2/CO$ ratio of syngas stream | 1.01 | 1.04 | 1.00 | 1.00 | 1.68 | 1.72 | 1.67 | 1.67 | 3.02 | 3.09 | 3.00 | 3.01 |

That which is claimed is:

1. A method for producing a syngas stream, the method at least comprising the steps of:
    (a) providing a hydrocarbon-containing stream;
    (b) providing a reactor containing a heated mass of solids at a temperature of at least 1000° C.;
    (c) cracking the hydrocarbon-containing stream provided in step (a) in the reactor containing the heated mass of solids provided in step (b), thereby at least obtaining C and $H_2$;
    (d) removing an $H_2$-containing stream from the reactor;
    (e) converting the C obtained in step (c) in the reactor by feeding a $CO_2$-containing stream and steam to the reactor at an $H_2O/CO_2$ vol. % feed ratio of greater than 0.0001, thereby obtaining a $CO/H_2$-containing stream;
    (f) removing the $CO/H_2$-containing stream from the reactor;
    (g) combining the $H_2$-containing stream removed in step (d) with the $CO/H_2$-containing stream removed in step (f) thereby obtaining a syngas stream having a $H_2/CO$ vol. % ratio of at least 1.0 and below 3.1.

2. The method according to claim 1, wherein the hydrocarbon-containing stream provided in step (a) comprises at least 10 ppm mercaptans.

3. The method according to claim 1, wherein the hydrocarbon-containing stream provided in step (a) comprises at least 1.0 vol. % olefins.

4. The method according to claim 1, wherein the reactor containing the heated mass of solids is in step (c) at a temperature of at least 1100° C.

5. The method according to claim 1, wherein the $H_2$-containing stream removed from the reactor in step (d) comprises at least 1 ppm $H_2S$, which is at least partially removed before combining in step (g).

6. The method according to claim 1, wherein a part of the $H_2$-containing stream removed from the reactor in step (d) is used to heat the reactor.

7. The method according to claim 1, wherein the reactor containing the heated mass of solids is in step (e) at a temperature of at least 1000° C.

8. The method according to claim 1, wherein in step (e) the C obtained in step (c) is converted in the reactor at an $H_2O/CO_2$ vol. % feed ratio of at least 0.9 and at most 1000.

9. The method according to claim 1, wherein the syngas stream obtained in step (g) has a $H_2/CO$ vol. % ratio of at least 1.75 and at most 2.2.

\* \* \* \* \*